United States Patent [19]
Bentsen

[11] 3,871,396
[45] Mar. 18, 1975

[54] AIR FLOW AMPLIFIER

[75] Inventor: Louis J. Bentsen, Arlington Heights, Ill.

[73] Assignee: Honeywell Inc., Minneapolis, Minn.

[22] Filed: June 23, 1972

[21] Appl. No.: 265,901

[52] U.S. Cl.............................. 137/85, 137/596.18
[51] Int. Cl.......................... F15c 3/04, G05d 16/00
[58] Field of Search................... 137/85, 596.18, 86

[56] References Cited
UNITED STATES PATENTS

| | | | |
|---|---|---|---|
| 3,425,434 | 2/1969 | Strickland | 137/596.18 X |
| 3,565,094 | 2/1971 | Pisoni | 137/85 |
| 3,648,716 | 3/1972 | Joesting | 137/85 |

*Primary Examiner*—Alan Cohan
*Attorney, Agent, or Firm*—Trevor B. Joike; Henry L. Hanson

[57] ABSTRACT

A miniaturized air flow amplifier designed for use in a pneumatic conditon control system comprises diaphragm logic components and has a main pressure input, a branch pressure input, and a pressure outlet. The branch pressure input and the output pressure are continuously held substantially equal. The air flow amplifier is particularly suited for use where a pressure signal equal to branch pressure is needed but with an increased volume flow rate, such as where a fast response is desired in an actuator or the like.

4 Claims, 2 Drawing Figures

AIR FLOW AMPLIFIER

BACKGROUND AND SUMMARY OF THE INVENTION

This invention relates to a miniaturized air flow amplifier particularly suited for use in diaphragm logic circuits.

Miniaturized diaphragm logic circuits typically require very low volume flow rate during operation. While this is desirable from the standpoint of air consumption, the low flow rate results in a long response time when the diaphragm logic circuit is interfaced with an actuator such as a damper actuator or valve actuator or the like. Accordingly there exists a need for a miniaturized air flow amplifier which provides a substantially increased air flow while maintaining a pressure equal to the output pressure of the diaphragm logic circuit. The subject invention fulfills this need in addition to being relatively simple and having a relatively low cost.

The air flow amplifier of the subject invention comprises a double layered diaphragm module interconnected with a single layered diaphragm module. The double layered diaphragm module compares the branch pressure input and the pressure output in order that they may be maintained equal, and supplies main pressure to the output when the output falls below the branch pressure input. The single layered diaphragm module provides an exhaust function to exhaust the output pressure when the branch pressure input falls below the output pressure.

The advantages of the subject invention will become apparent upon a reading of the detailed description of the invention in view of the drawing wherein:

FIGS. 1 and 2 are schematic illustrations of two embodiments of the air flow amplifier.

DETAILED DESCRIPTION OF THE INVENTION

Figure 1:
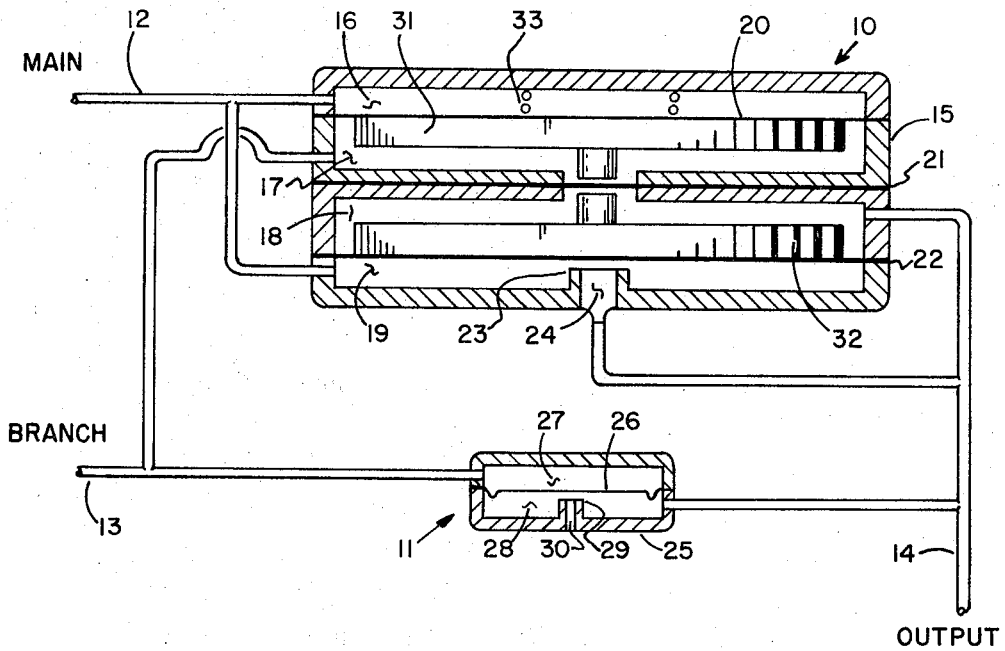

The air flow amplifier comprises a double layered module or valve means 10 and a single layered module or exhaust means 11. A main pressure input is provided at 12, a branch pressure input is provided at 13, and an output is provided at 14.

The valve means 10 is comprised of a housing 15, a first pressure chamber 16, a second pressure chamber 17, a third pressure chamber 18 and a fourth pressure chamber 19. Sealably separating the first and second pressure chambers 16 and 17 is a first diaphragm means 20. Sealably separating second and third pressure chambers 17 and 18 is a second diaphragm means 21. Sealably separating the third and fourth pressure chambers 18 and 19 is a third diaphragm means 22. Disposed within the fourth pressure chamber 19 is an annular valve seat 23 which sealably cooperates with the third diaphragm means 22 to define a fifth pressure chamber 24.

Connected to the first and fourth pressure chambers 16 and 19 is the main pressure inlet 12. The branch pressure inlet 13 is connected to the second pressure chamber 17 and to the exhaust means 11. The outlet 14 is connected to the third pressure chamber 18, the fifth pressure chamber 24, and to the exhaust means 11.

The exhaust means 11 comprises a housing 25 divided by a diaphragm 26 into a control chamber 27 and a flow chamber 28. Disposed within the flow chamber 28 is an annular partition means 29 which sealably cooperates with the diaphragm 26 to define a valving chamber 30. The branch pressure inlet 13 is connected to the control chamber of exhaust means 11, the outlet is connected to the flow chamber 28 of exhaust means 11, and the valving chamber 30 of exhaust means 11 is allowed to communicate with the atmosphere.

Disposed within the second pressure chamber 17 and associated with first diaphragm means 20 is a first pressure plate 31. Oppositely disposed in the third pressure chamber 18 and associated with third diaphragm means 22 is a second pressure plate 32. The first and second pressure plates 31 and 32 comprise a spool-shaped member. The combination of the first and second pressure plates and the first, second, and third diaphragm means comprises a valve closure means. Pressure in the second pressure chamber 17 or in the fourth pressure chamber 19 tends to move the valve closure means in a first direction or upwardly away from the valve seat 23. Pressure in the first pressure chamber 16 or in the third pressure chamber 18 tends to urge the valve closure means in a second direction or downwardly towards the valve seat.

Main pressure acts on the valve closure means in both the first and fourth pressure chambers 16 and 19; the forces exerted on the valve closure means by virtue of the presence of main pressure are accordingly substantially cancelled. The branch pressure in the second pressure chamber 17 and the output pressure in the third pressure chamber 18 are also cancelled out but only when the branch pressure and outlet pressure are substantially equal.

Disposed within the first pressure chamber 16 is a light closing spring 33 which urges the valve closure means against the valve seat 23. The use of the spring 33 prevents a continuous bleed when the amplifier is in a balanced position and increases the dead zone or change in branch pressure necessary to effect a correction in the output pressure. It may, on the other hand, be desirable to put a light spring in the fourth pressure chamber 19 to urge the valve closure means away from the valve seat 23 in order to reduce the dead zone. It is not necessary, however, for there to be a spring in either the first or the fourth pressure chamber in order to achieve satisfactory performance of the amplifier.

In operation, when the branch pressure and the outlet pressure are equal, the fifth pressure chamber 24 is kept substantially closed. If the branched pressure begins to increase, the increased pressure in the second pressure chamber allows the valve closure means to be urged away from the valve seat 23 thereby allowing the main pressure inlet 12 and the outlet 14 to communicate. The outlet pressure is accordingly increased until it substantially equals the branch pressure input at which time the fifth pressure chamber 24 is again closed off. When the branch pressure is greater than the outlet pressure, the exhaust means 11 is maintained closed by virtue of the greater branch pressure in the control chamber 27 as opposed to the lesser output pressure in flow chamber 28.

When the branch pressure falls below the outlet pressure, that is when the outlet pressure is greater than the branch pressure, the greater outlet pressure in the third pressure chamber 18 causes the valve closure means to be urged against the valve seat 23 thereby cutting off communication between the main pressure inlet 12 and the outlet 14. At the same time the greater outlet pressure in the flow chamber 28 of exhaust means 11 as opposed to the lesser branch pressure in the control chamber 27 causes exhaust means 11 to open thereby allowing the outlet 14 to communicate with the atmosphere through valving chamber 30. The excess outlet pressure thereupon is exhausted and the outlet pressure and branch pressures again become substantially equal.

It is thus seen that the branch pressure and the outlet pressure are maintained substantially equal at all times. Since the branch pressure is dead-ended in the second pressure chamber 17 and the control chamber 27, only a very small flow rate in the branch line is necessary to operate the air flow amplifier. On the other hand the air flow capacity of the amplifier at the outlet is limited only by the size of the conduits utilized, and the available air flow of the main pressure source.

Figure 2:
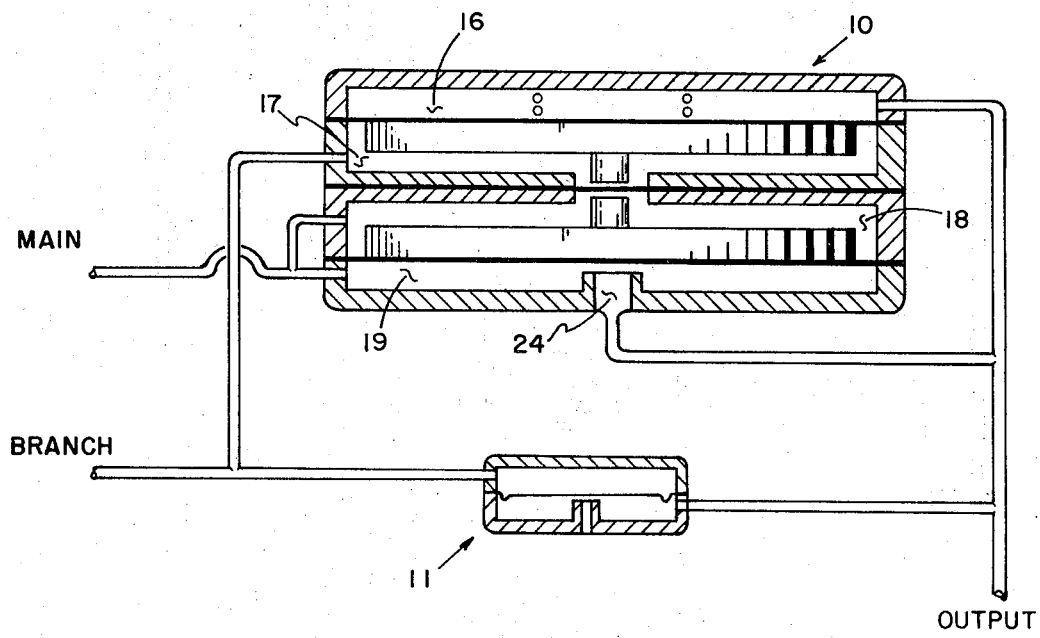

An alternative embodiment of the invention is shown in FIG. 2. In this embodiment the main pressure is connected to the third pressure chamber 18 instead of the first pressure chamber 16, and the outlet is connected to the first pressure chamber 16 instead of the third pressure chamber 18. All other connections remain the same. Unlike the embodiment of the invention shown in FIG. 1, the valve closure means of the FIG. 2 embodiment is not sandwiched in by main pressure in the first and fourth pressure chambers. Accordingly it may be desirable to fasten together the pressure plates and diaphragm means in the latter embodiment to prevent their being pulled apart by differing pressures. The operation of the two embodiments of the invention is otherwise the same.

The embodiments of the invention in which an exclusive property or right is claimed are defined as follows:

1. An air-flow amplifier having a main pressure inlet, a branch pressure inlet, and a pressure outlet, comprising:
    valve means including a valve seat and valve closure means, said valve closure means including
        first, second and third diaphragm means,
        first and second cooperable pressure plates associated with the first and third diaphragm means respectively;
    a housing containing said valve means, said housing having first, second, third, fourth and fifth pressure chambers, said first diaphragm separating said first chamber from said second chamber, said second diaphragm separating said second chamber from said third chamber and said third diaphragm separating said third chamber from said fourth chamber, the valve seat being disposed in the fourth pressure chamber and being arranged to sealably cooperate with the valve closure means to define said fifth chamber pressure;
    first connecting means connecting said main pressure to said fourth pressure chamber;
    second connecting means connecting said main pressure to said first pressure chamber;
    third connecting means connecting said branch chamber to said second pressure chamber;
    fourth connecting means connecting said output pressure to said third pressure chamber;
    fifth connecting means connecting said output pressure to said fifth pressure chamber; and,
    exhaust means connected between the branch pressure inlet and the pressure outlet,
    wherein the actions exerted on said valve closure means by said main pressure tend to cancel one another and further wherein said air-flow amplifier tends to maintain said outlet pressure equal to said branch pressure.

2. The invention according to claim 1 wherein the exhaust means comprises:
    housing means;
    diaphragm means dividing the housing means into a control chamber and a flow chamber;
    partition means disposed within the flow chamber and arranged to cooperate in a sealable relation with the diaphragm means to further define a valving chamber;
    the branch pressure being connected to the control chamber, the pressure outlet being connected to the flow chamber and the valving chamber being in communication with the atmosphere.

3. An air-flow amplifier having a main pressure inlet, a branch pressure inlet, and a pressure outlet, comprising:
    valve means including a valve seat and valve closure means, said valve closure means including
        first, second and third diaphragm means,
        first and second cooperable pressure plates associated with the first and third diaphragm means respectively;
    a housing containing said valve means, said housing having first, second, third, fourth and fifth pressure chambers, said first diaphragm separating said first chamber from said second chamber, said second diaphragm separating said second chamber from said third chamber and said third diaphragm separating said third chamber from said fourth chamber, the valve seat being disposed in the fourth pressure chamber and so arranged to sealably cooperate with the valve closure means to define said fifth chamber pressure;
    first connecting means connecting said main pressure inlet to said fourth pressure chamber;
    second connecting means connecting said main pressure inlet to said third pressure chamber;
    third connecting means connecting said branch pressure inlet to said second pressure chamber;
    fourth connecting means connecting said pressure outlet to said first pressure chamber;
    fifth connecting means connecting said pressure outlet to said fifth pressure chamber; and,
    exhaust means connected between the branch pressure inlet and the pressure outlet,
    wherein the actions exerted on said valve closure means by said main pressure tend to cancel one another and further wherein said air-flow amplifier tends to maintain said outlet pressure equal to said branch pressure.

4. The invention according to claim 3 wherein the exhaust means comprises:
    housing means;
    diaphragm means dividing the housing means into a control chamber on a flow chamber;
    partition means disposed within the flow chamber and arranged to cooperate in a sealable relation with the diaphragm means to further define a valving chamber;
    the branch pressure being connected to the control chamber, the pressure outlet being connected to the flow chamber and the valving chamber being in communication with the atmosphere.

* * * * *